United States Patent
Huang (10) Patent No.: US 7,226,224 B2
(45) Date of Patent: Jun. 5, 2007

(54) MINIATURIZED LENS ASSEMBLY

(75) Inventor: Yao-Ching Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 283 days.

(21) Appl. No.: 11/069,223

(22) Filed: Feb. 28, 2005

(65) Prior Publication Data

US 2006/0067675 A1 Mar. 30, 2006

(30) Foreign Application Priority Data

Sep. 24, 2004 (TW) ............... 93129021 A (51) Int. Cl.
*G03B 9/10* (2006.01)
*G03B 9/02* (2006.01)

(52) U.S. Cl. ............ 396/451; 396/458; 396/462; 396/493

(58) Field of Classification Search ............... 396/449, 396/451, 458, 460, 462; 359/740
See application file for complete search history.

(56) References Cited

U.S. PATENT DOCUMENTS

| | | | | |
|---|---|---|---|---|
| 5,083,149 A | * | 1/1992 | Kudo et al. | 396/80 |
| 5,997,187 A | * | 12/1999 | Hamasaki | 396/449 |
| 6,585,429 B2 | * | 7/2003 | Yaginuma et al. | 396/458 |
| 6,767,146 B2 | * | 7/2004 | Nishimoto | 396/463 |
| 6,835,006 B2 | * | 12/2004 | Tanaka et al. | 396/349 |

* cited by examiner

*Primary Examiner*—W. B. Perkey
*Assistant Examiner*—Rishi S. Suthar
(74) *Attorney, Agent, or Firm*—Ladas & Parry LLP (57) ABSTRACT

A miniaturized lens assembly includes a front lens portion, a rear lens portion, a large diaphragm plate mounted between the front and rear lens portions, a small diaphragm plate rotatable relative to the large diaphragm plate, a shutter plate rotatable relative to the large diaphragm plate, first and second actuating elements mounted on the rear lens portion, and two pivot axles mounted between the front and rear lens portions. The miniaturized lens assembly is miniature in size, is simple in structure, and is easy to assemble.

6 Claims, 10 Drawing Sheets

MINIATURIZED LENS ASSEMBLY

CROSS-REFERENCE TO RELATED APPLICATION

This application claims priority of Taiwanese Application No. 093129021, filed on Sep. 24, 2004.

BACKGROUND OF THE INVENTION

1. Field of the Invention

The invention relates to a lens assembly, more particularly to a miniaturized lens assembly.

2. Description of the Related Art

Figure 1:
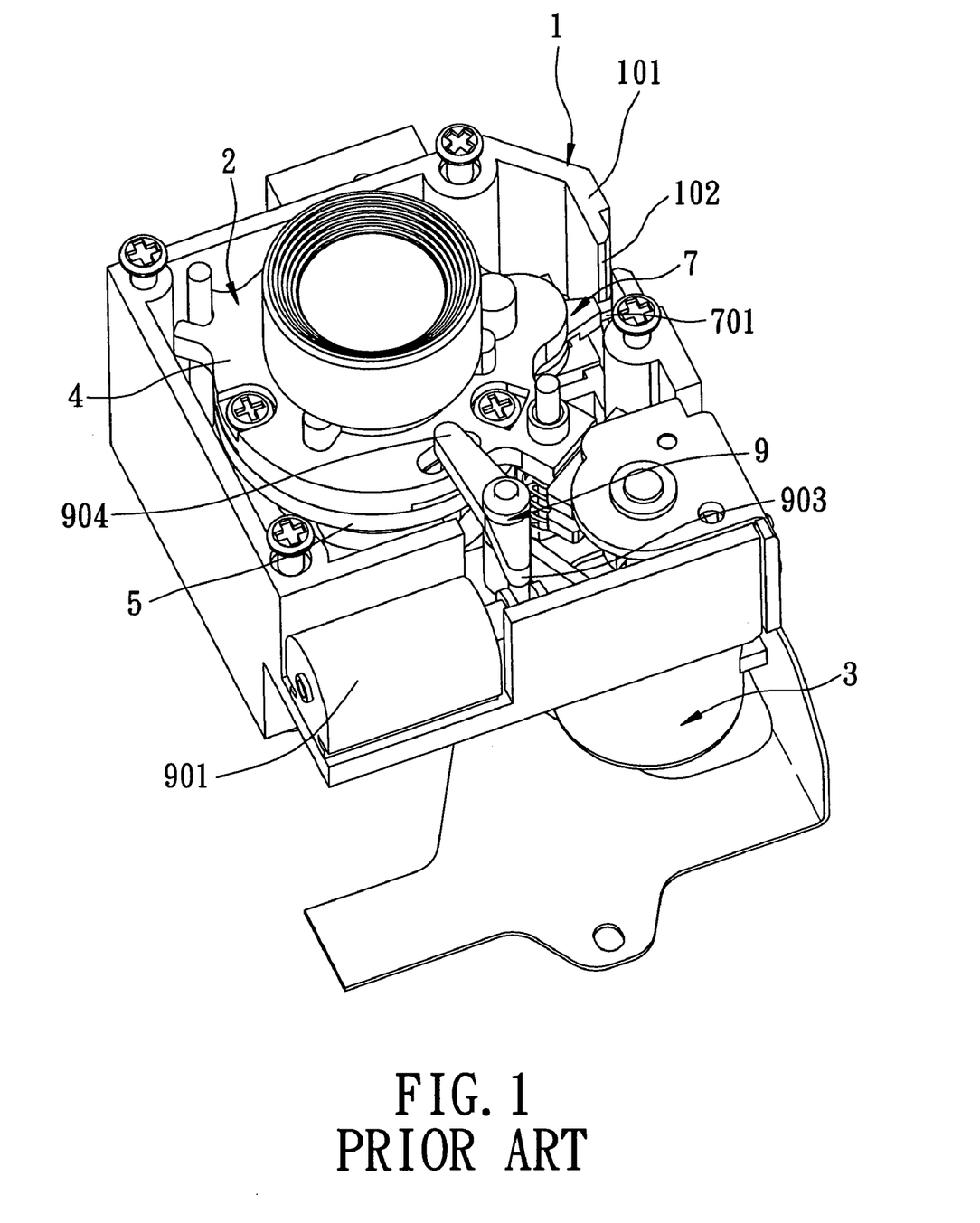
FIG. 1 is a perspective view of a conventional lens assembly.
Figure 2:
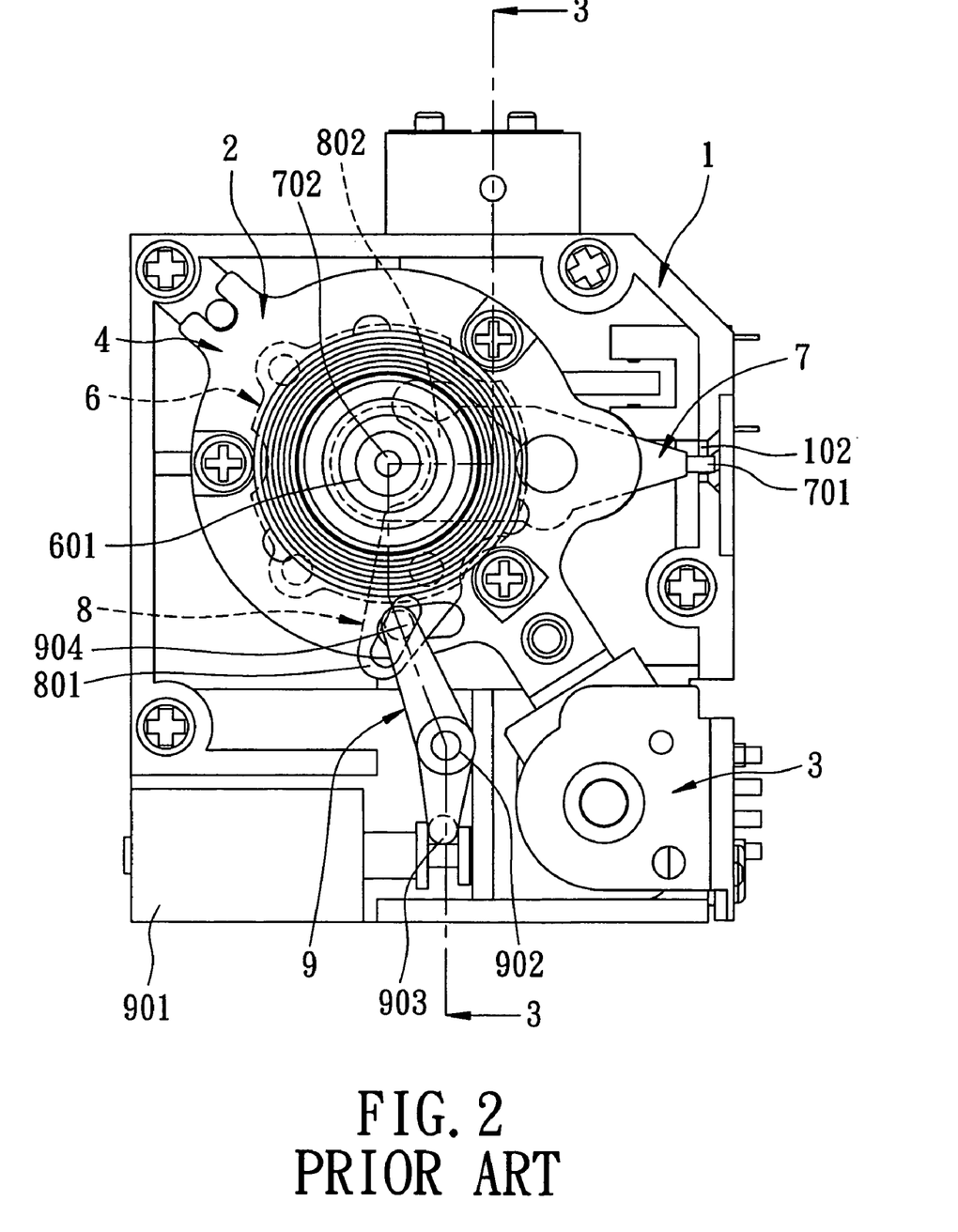
FIG. 2 is a top view of the conventional lens assembly.
Figure 3:
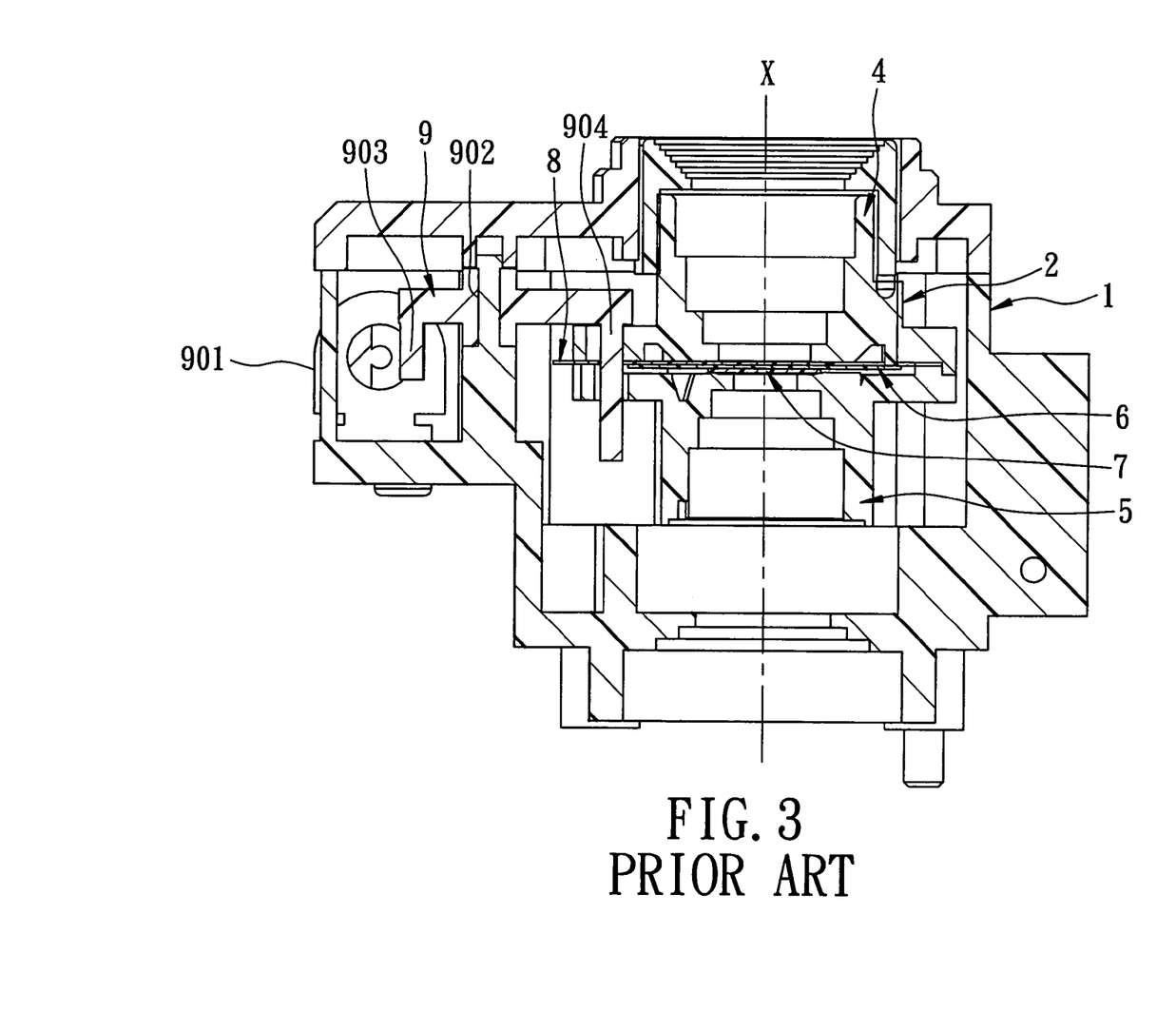
FIG. 3 is a sectional view taken along line 3—3 of FIG. 2.

Referring to FIGS. 1, 2 and 3, a conventional lens assembly includes a shell unit 1, a lens unit 2 received in the shell unit 1, and a motor 3 for actuating the lens unit 2.

The shell unit 1 has a peripheral wall 101 and a guiding groove 102 in the peripheral wall 101.

The lens unit 2 has a front lens portion 4, a rear lens portion 5 opposite to the front lens portion 4 along a longitudinal axis (X), a large diaphragm plate 6 mounted between the front lens portion 4 and the rear lens portion 5, a small diaphragm plate 7 mounted pivotally between the front lens portion 4 and the rear lens portion 5 and rotatable relative to the large diaphragm plate 6, a shutter plate 8 mounted pivotally between the front lens portion 4 and the rear lens portion 5 and rotatable relative to the large diaphragm plate 6, a connecting member 9 mounted pivotally on the shell unit 1 and connected to the shutter plate 8, and an electromagnetic actuator 901 mounted on the shell unit 1 for actuating the connecting member 9.

The large diaphragm plate 6 has a large aperture 601 along the longitudinal axis (X). The small diaphragm plate 7 has a coupling end portion 701 movably anchored in the guiding groove 102 of the shell unit 1, and a small aperture 702 for overlapping or moving away from the large aperture 601. The shutter plate 8 has an actuated portion 801 and a shading portion 802 for covering or moving away from the large aperture 601. The connecting member 9 is mounted outside the front lens portion 4, and has a pivoting portion 902, an actuated end portion 903 extending from the pivoting portion 902 and actuated by the electromagnetic actuator 901, and a transmitting end portion 904 opposite to the actuated end portion 903 and coupled to the actuated portion 801.

Figure 4:
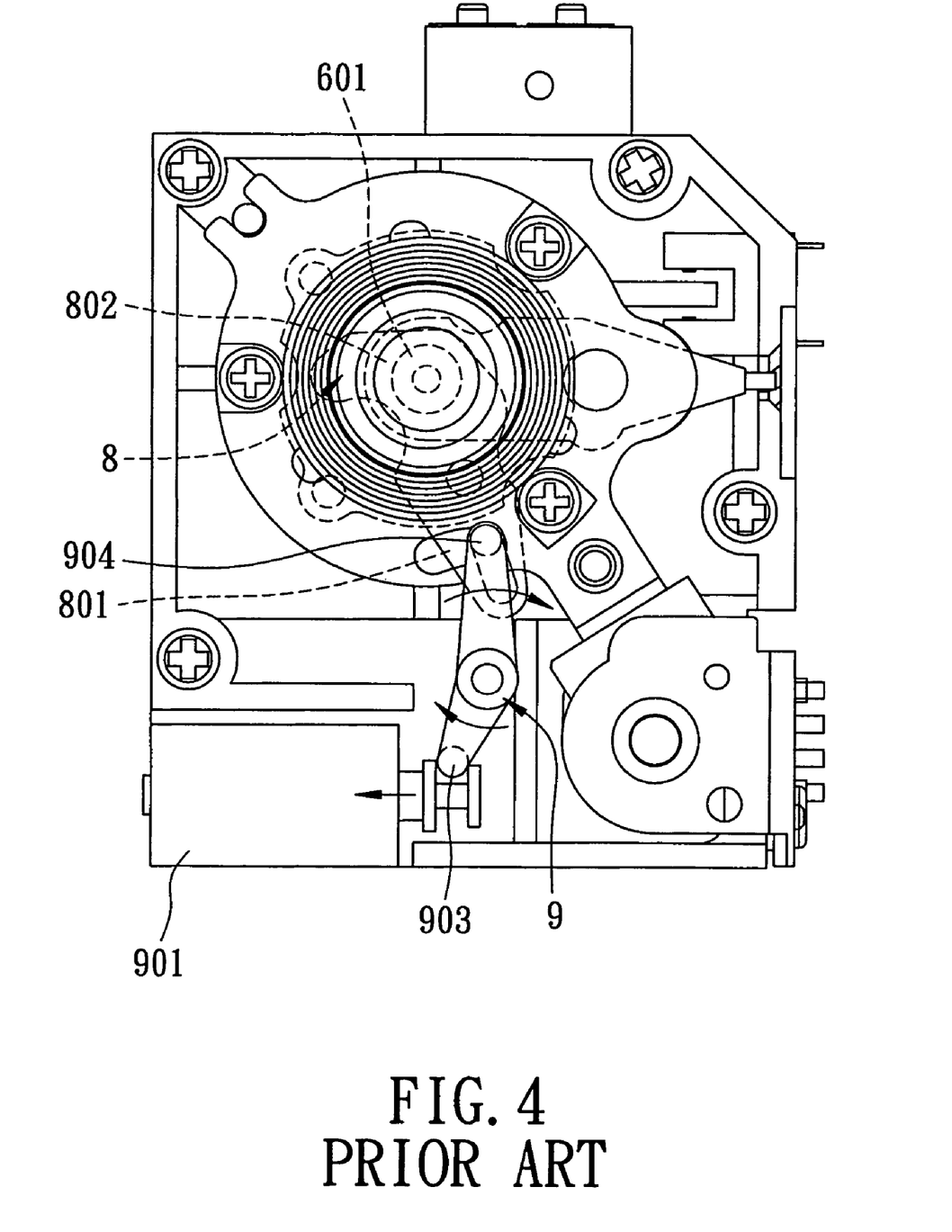
FIG. 4 is another top view of the conventional lens assembly showing the movement of a shutter plate of the conventional lens assembly.

When the motor 3 is actuated to move the lens unit 2 along the longitudinal axis (X), the switching between the large and small apertures 601,702 can be achieved through the action of the coupling end portion 701 in the guiding groove 102. As shown in FIGS. 2 and 4, when the actuated end portion 903 of the connecting member 9 is actuated by the electromagnetic actuator 901, the actuated portion 801 of the shutter plate 8 can be actuated by the transmitting end portion 904 so that the shading portion 802 of the shutter plate 8 can be moved relative to the large aperture 601 to shade or move away from the latter so as to achieve the purpose of controlling the shutter plate 8.

Although the switching between the large and small apertures 601,702 and the control of the shutter plate 8 can be achieved in the aforesaid conventional lens assembly, the following disadvantages are encountered:

1. Since the shutter plate 8 is controlled by the pivotal movement of the connecting member 9 actuated by the electromagnetic actuator 901, the volume occupied thereby is relatively large.

2. Since the switching between the large and small apertures 601,702 is conducted by the cooperation of the small diaphragm plate 7 and the guiding groove 102 of the shell unit 1, and since the control of the shutter plate 8 is actuated by the pivotal movement of the connecting member 9, testing of the lens unit 2 is conducted after the lens unit 2 is installed on the shell unit 1. If the lens unit 2 needs to be modified or adjusted after the test, it is required to disassemble the same from the shell unit 1. Therefore, the process for making the conventional lens assembly is troublesome.

3. The transmitting end portion 904 of the connecting member 9 should have a length sufficient for the operation of the lens unit 2, and should be inserted between the front and rear lens portions 4,5 in order to connect to the actuated portion 801 of the shutter plate 8 interposed between the front and rear lens portions 4,5. Therefore, the installation of the conventional lens assembly is relatively complicated.

4. The accuracy of the action of the shutter plate 8 may be affected by the accumulated tolerance of the amount of the magnetic affinity of the electromagnetic actuator 901, the clearance between the transmitting end portion 904 of the connecting member 9 and the shutter plate 8, the clearance between the pivoting portion 902 of the connecting member 9 and the shell unit 1, and the like.

SUMMARY OF THE INVENTION

The object of the present invention is to provide a miniaturized lens assembly which is simple in structure, which is miniature in size, and which is relatively easy to assemble and convenient to test.

Therefore, a miniaturized lens assembly according to this invention includes a lens unit, which has a front lens portion, a rear lens portion opposite to the front lens portion, a large diaphragm plate mounted between the front lens portion and the rear lens portion, a small diaphragm plate mounted pivotally between the front lens portion and the rear lens portion and rotatable relative to the large diaphragm plate, a shutter plate mounted pivotally between the front lens portion and the rear lens portion and rotatable relative to the large diaphragm plate, first and second actuating elements mounted on the rear lens portion, and two pivot axles mounted between the front and rear lens portions and distal from each other. The large diaphragm plate has a large aperture. The small diaphragm plate has a first pivot portion pivotally connected to one of the pivotal axles, a swing portion opposite to the first pivot portion, a first actuated portion proximate to the first pivot portion, and a small aperture provided in the swing portion. The first actuated portion is actuated by the first actuating element to move the small diaphragm plate between a first position in which the small aperture is aligned with the large aperture, and a second position in which the small aperture is moved away from the large aperture. The shutter plate has a second pivot portion pivotally connected to the other of the pivot axles, a shading portion opposite to the second pivot portion, and a second actuated portion proximate to the second pivot portion. The second actuated portion is actuated by the second actuating element to move the shutter plate between an open position in which the shading portion is away from the large aperture, and a closed position in which the shading portion covers the large aperture. The first and second actuating elements respectively have actuating portions connected to the first and second actuated portions, respectively.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 5:
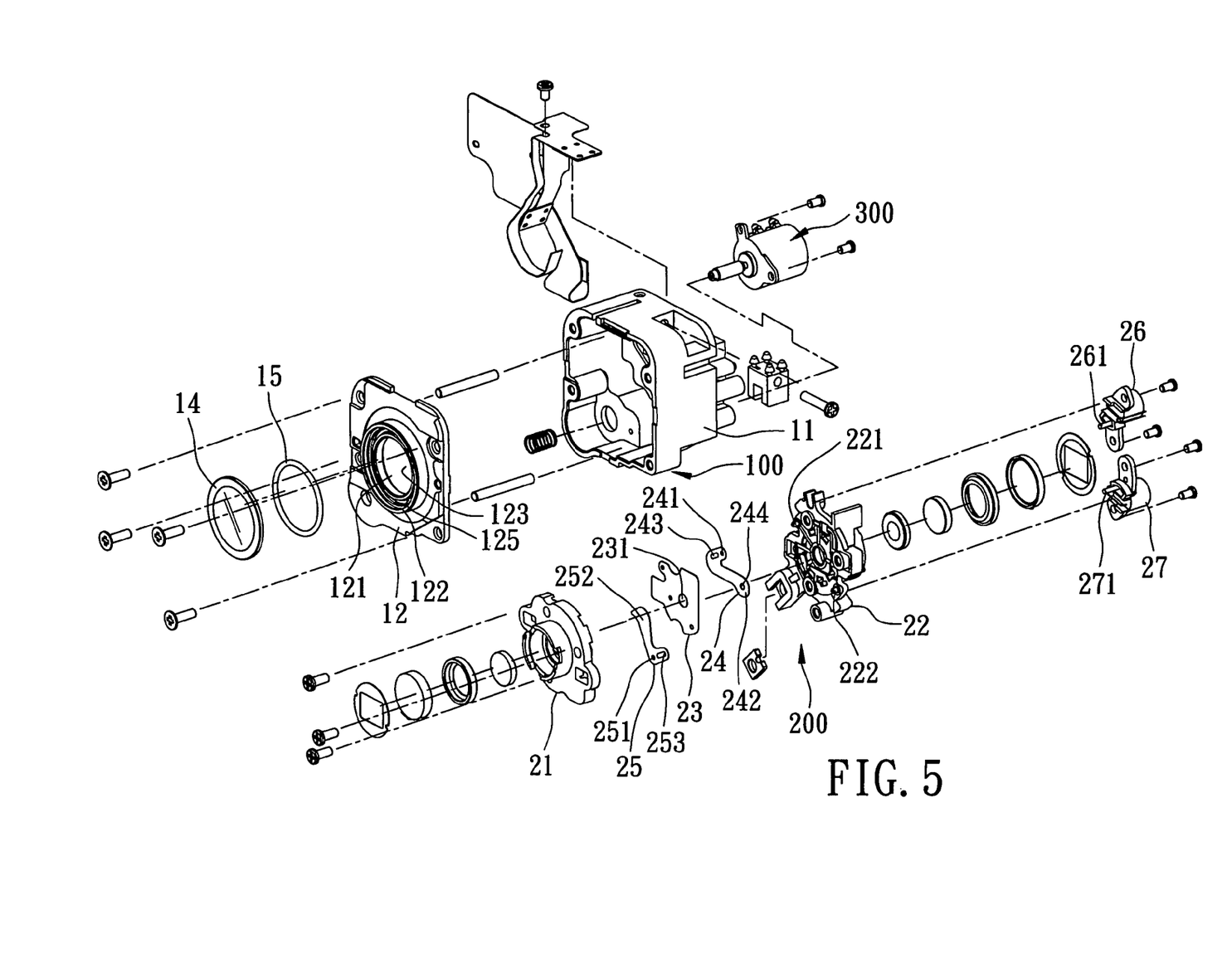
FIG. 5 is an exploded perspective view of the preferred embodiment of a miniaturized lens assembly according to this invention.
Figure 6:
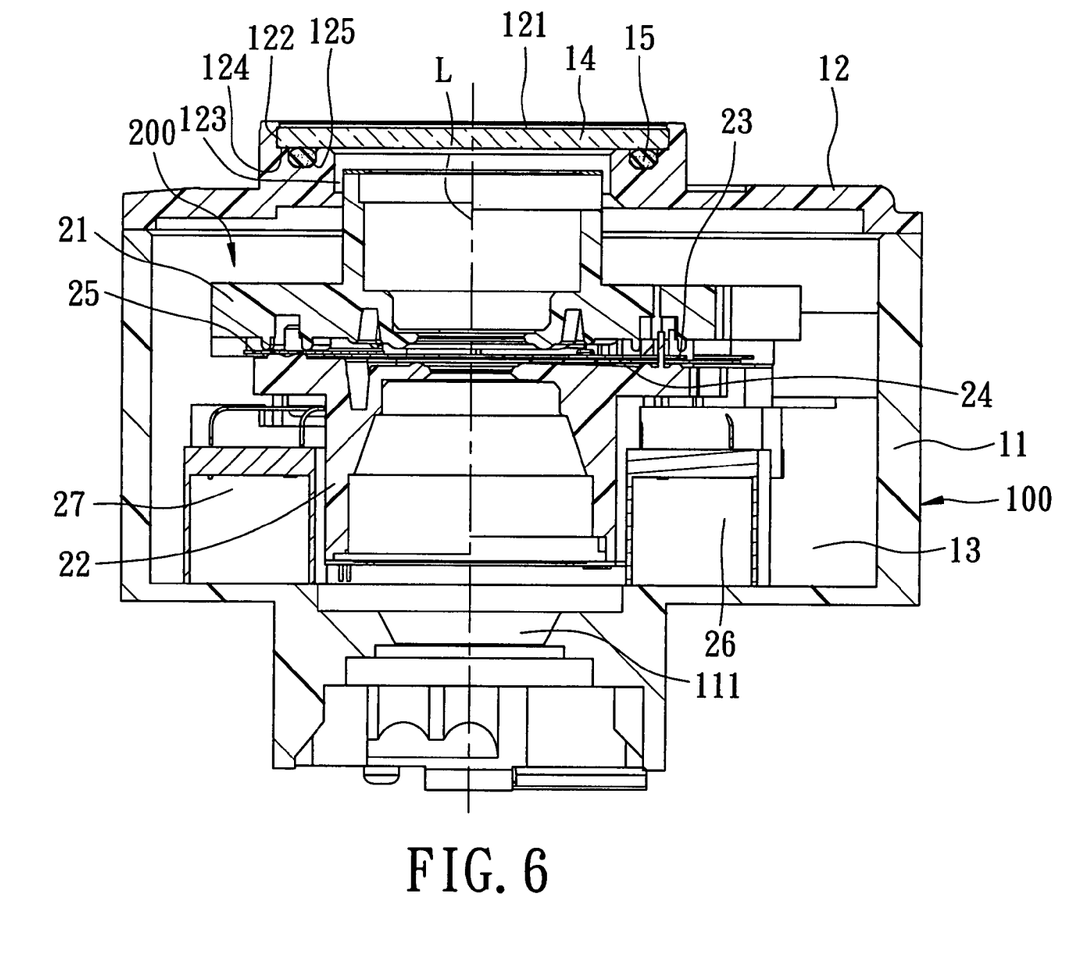
FIG. 6 is a sectional view of the preferred embodiment.

Referring to FIGS. 5 and 6, the preferred embodiment of the miniaturized lens assembly according to this invention includes a shell unit 100, a lens unit 200 mounted in the shell unit 100, and a motor 300 mounted on the shell unit 100 for actuating the lens unit 200. As the configuration for connecting the motor 300 to the lens unit 200 is well known to the skilled artisan, it will not be described herein in detail.

The shell unit 100 includes a receiving box 11 having a lens hole 111, and a cap 12 having a lens hole 121 aligned with the lens hole 111 of the receiving box 11 along a longitudinal axis (L). The receiving box 11 cooperates with the cap 12 to define a receiving space 13 for receiving the lens unit 200. The lens hole 121 of the cap 12 is formed as a stepped hole configuration, and includes a large diameter ring portion 122, a small diameter ring portion 123, a shoulder face 124 between the large and small diameter ring portions 122, 123, and an annular groove 125 formed in the shoulder face 124. The shell unit 100 further includes a protecting lens 14 mounted to the large diameter ring portion 122, and a leak-proof element 15 mounted in the annular groove 125 to achieve air-tight and water-proof effects for the lens hole 121 of the cap 12.

The lens unit 200 is mounted in the receiving space 13, and includes a front lens portion 21 proximate to the cap 12, a rear lens portion 22 opposite to the front lens portion 21 and distal from the cap 12, a large diaphragm plate 23 mounted between the front lens portion 21 and the rear lens portion 22, a small diaphragm plate 24 mounted pivotally between the front lens portion 21 and the rear lens portion 22 and rotatable relative to the large diaphragm plate 23, a shutter plate 25 mounted pivotally between the front lens portion 21 and the rear lens portion 22 and rotatable relative to the large diaphragm plate 23, first and second actuating elements 26, 27 mounted on the rear lens portion 22, and first and second pivot axles 221, 222 mounted between the front and rear lens portions 21, 22 and distal from each other. In the preferred embodiment, the first and second pivot axles 221, 222 are mounted on the rear lens portion 22 and protrude toward the front lens portion 21.

Figure 7:
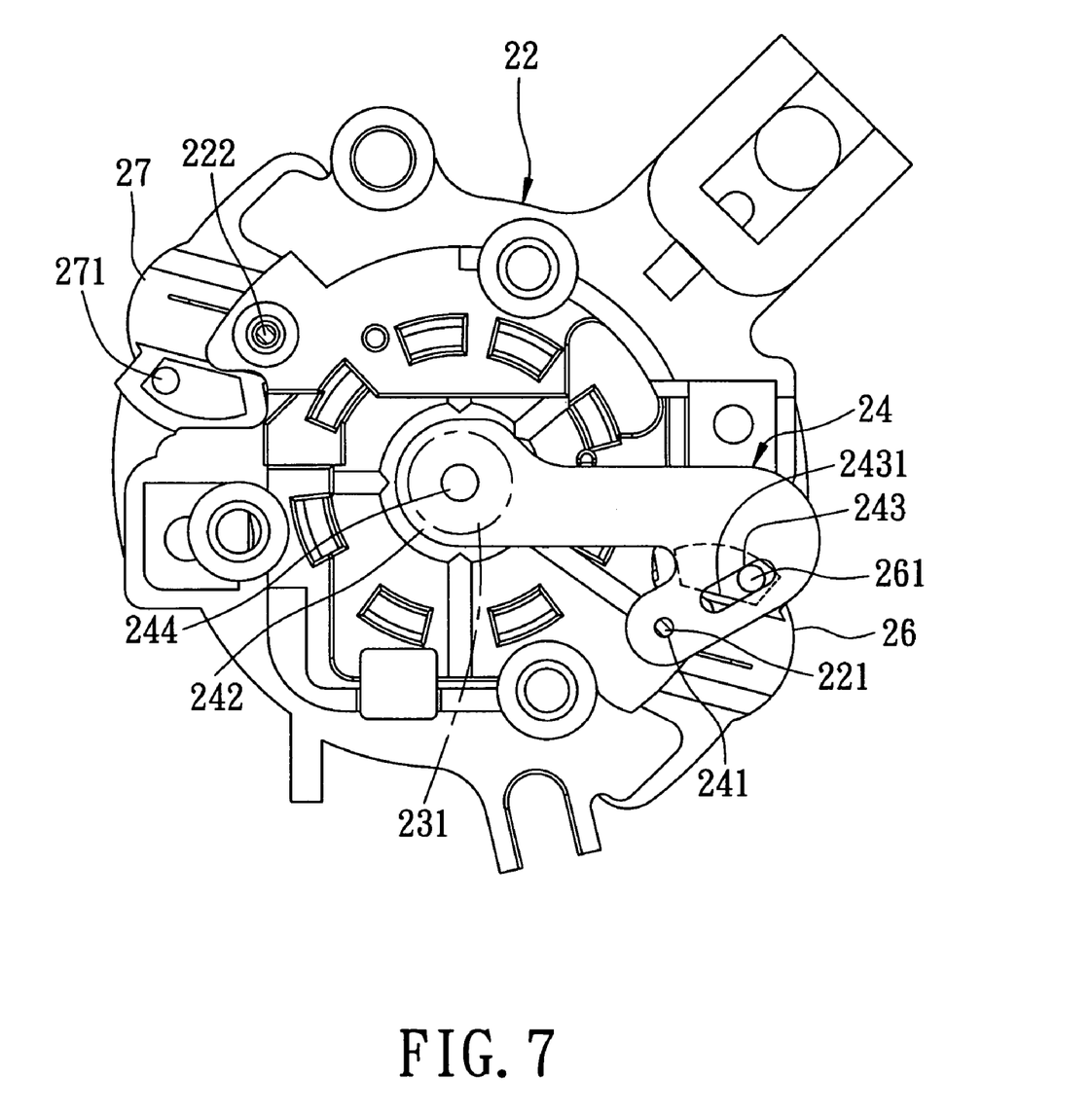
FIG. 7 is a schematic view showing a state in which a small diaphragm plate and a large diaphragm plate of the preferred embodiment are aligned with each other.

Referring to FIG. 7, the large diaphragm plate 23 has a large aperture 231. The small diaphragm plate 24 has a first pivot portion 241 pivotally connected to the first pivotal axle 221, a swing portion 242 opposite to the first pivot portion 241, a first actuated portion 243 proximate to the first pivot portion 241, and a small aperture 244 provided in the swing portion 242. The first actuated portion 243 has an elongate hole 2431. The first actuating element 26 includes an electromagnetically operated rod 261 slidable in the elongated hole 2431 in the small diaphragm plate 24.

Figure 9:
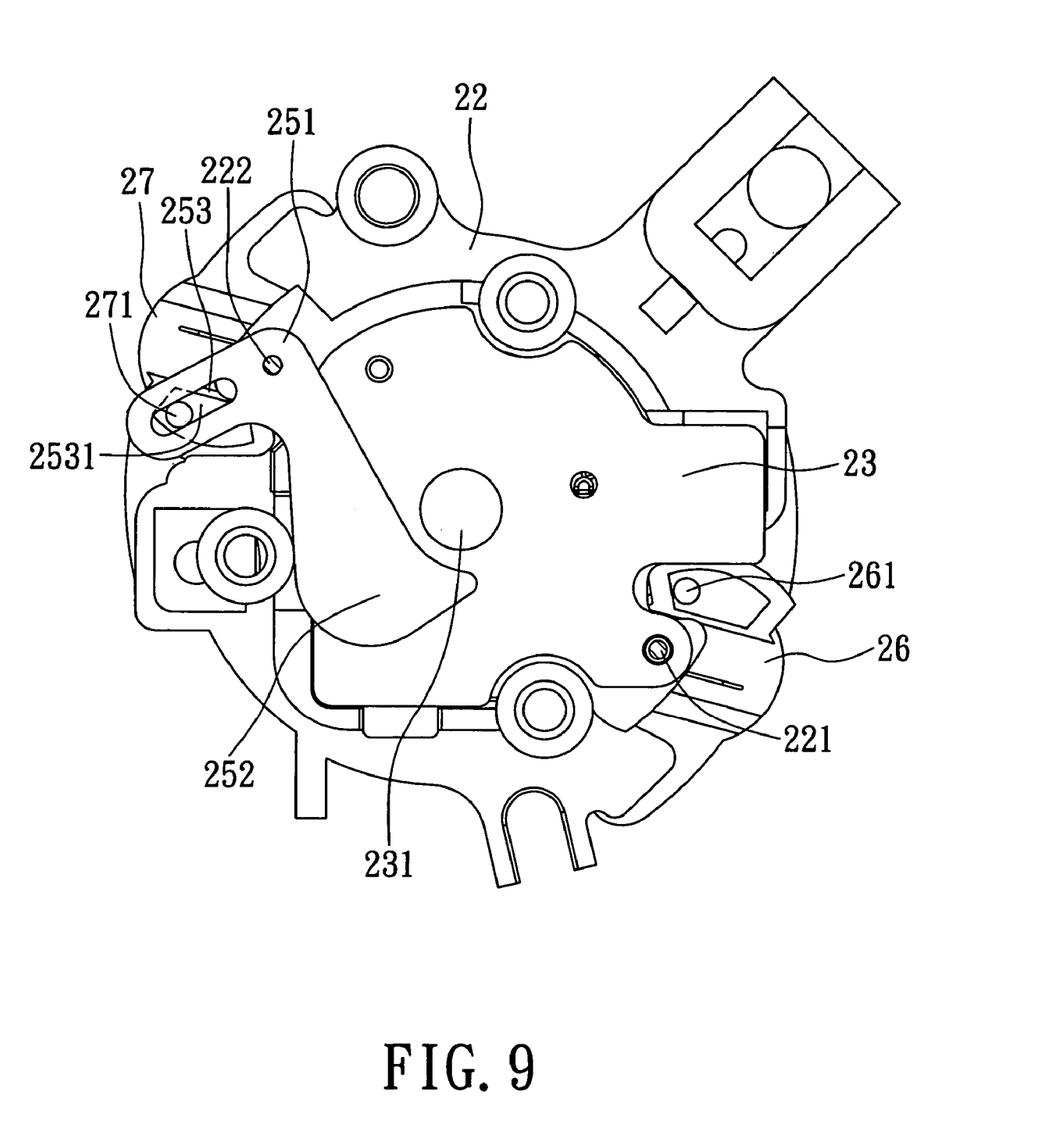
FIG. 9 is a schematic view showing a state in which a shutter plate of the preferred embodiment is moved away from the large diaphragm plate.

Referring to FIGS. 5 and 9, the shutter plate 25 has a second pivot portion 251 pivotally connected to the second pivot axle 222, a shading portion 252 opposite to the second pivot portion 251, and a second actuated portion 253 proximate to the second pivot portion 251. The second actuated portion 253 has an elongate hole 2531. The second actuating element 27 includes an electromagnetically operated rod 271 slidable in the elongated hole 2531 in the shutter plate 25.

Figure 8:
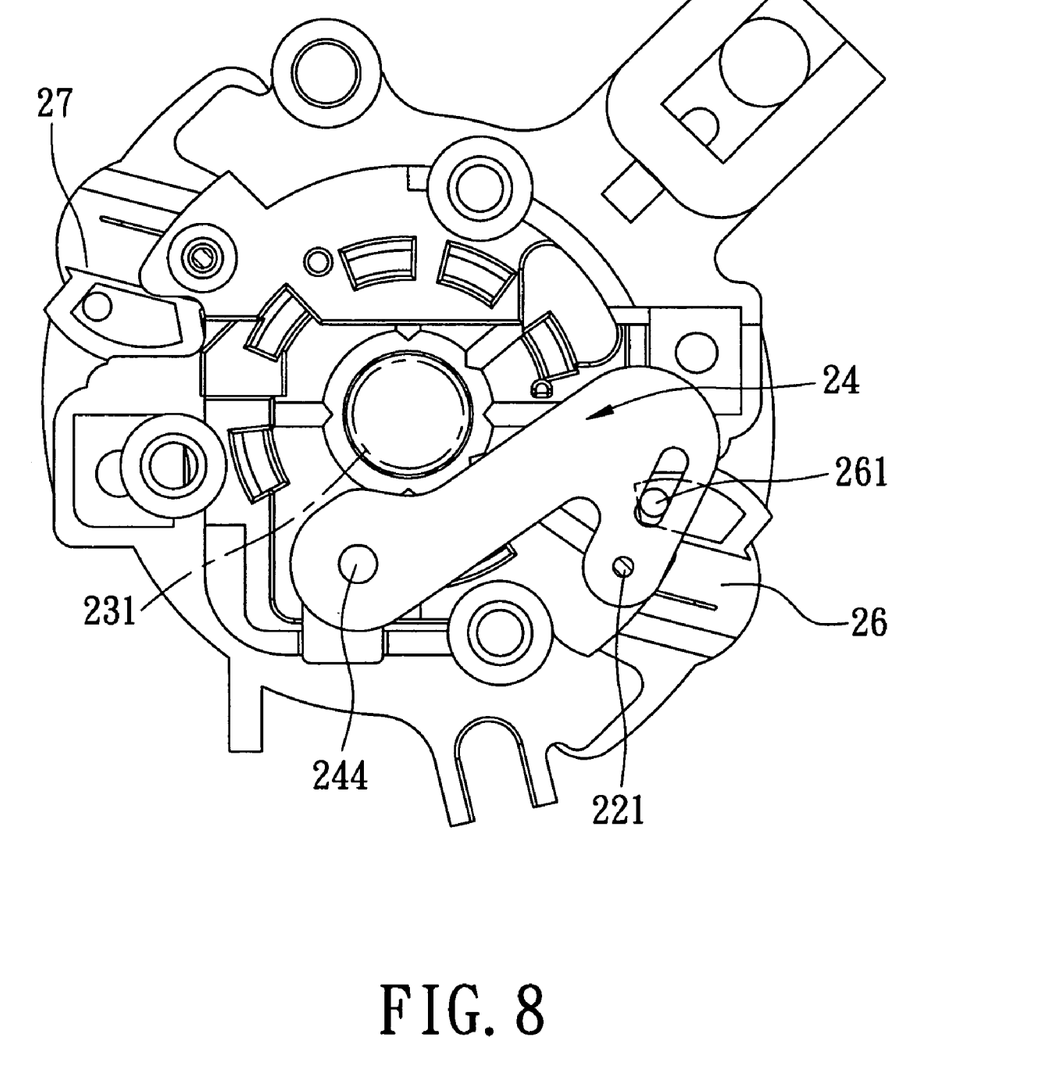
FIG. 8 is a schematic view showing a state in which the small diaphragm plate and the large diaphragm plate of the preferred embodiment are moved away from each other.

Referring to FIGS. 7 and 8, when a camera including the miniaturized lens assembly of this invention is operated by a user, the result of light detection is transmitted to the lens unit 200. The first actuated portion 243 can be actuated by the first actuating element 26 to move the small diaphragm plate 24 from a first position in which the small aperture 244 is aligned with the large aperture 232, to a second position in which the small aperture 244 is moved away from the large aperture 231.

Figure 10:
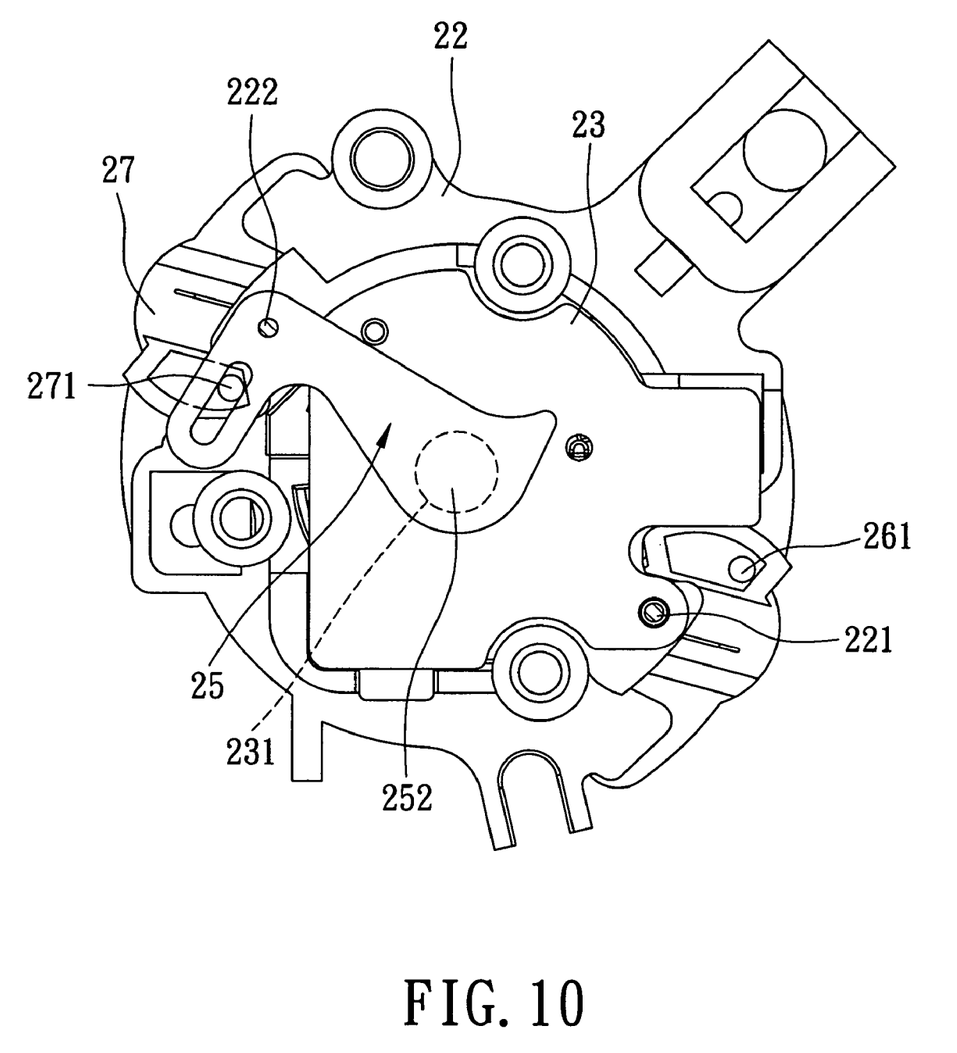
FIG. 10 is a schematic view showing a state in which the shutter plate covers the large diaphragm plate.

Referring to FIGS. 9 and 10, when the second actuating element 27 is driven by the user through operation of a button (not shown), the second actuated portion 253 is actuated by the second actuating element 27 to move the shutter plate 25 from an open position in which the shading portion 252 is away from the large aperture 231, to a closed position in which the shading portion 252 covers the large aperture 231 so as to achieve the purpose of controlling the exposure time.

In view of the aforesaid, the miniaturized lens assembly of this invention has the following advantages:

1. The small diaphragm plate 24 and the shutter plate 25 are controlled respectively by the first and second actuating elements 26, 27, which are mounted on the rear lens portion 22. The lens unit 200 is constructed by assembling the front lens portion 21, the rear lens portion 22, the large diaphragm plate 23, the small diaphragm plate 24, the shutter plate 25, the first actuating element 26, and the second actuating element 27 together. Therefore, the lens assembly of this invention is miniaturized as compared to the conventional lens assembly.

2. The first and second actuating elements 26, 27 for respectively actuating the small diaphragm plate 24 and the shutter plate 25 are mounted on the rear lens portion 22, rather than on the shell unit 100. Therefore, testing of the lens unit 200 can be conducted before being mounted in the shell unit 100. The process for making the miniaturized lens assembly of this invention is simplified accordingly.

3. The first and second pivot axles 221, 222 are mounted on the rear lens portion 22. The electromagnetically operated rod 261 of the first actuating element 26 and the electromagnetically operated rod 271 of the second actuating element 27 can be recognized easily after the first and second actuating elements 26, 27 are mounted on the rear lens portion 22. Therefore, the large diaphragm plate 23, the small diaphragm plate 24, and the shutter plate 25 can be assembled with relative ease.

4. The small diaphragm plate 24 and the shutter plate 25 are actuated directly by the first actuating element 26 and the second actuating element 27, respectively. No additional coupling mechanism is required between the small diaphragm plate 24 and the first actuating element 26 or between the shutter plate 25 and the second actuating element 27. Therefore, the accuracy for controlling movement of the small diaphragm plate 24 and the shutter plate 25 is increased.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A miniaturized lens assembly, comprising:
a lens unit including a front lens portion, a rear lens portion opposite to said front lens portion, a large diaphragm plate mounted between said front lens portion and said rear lens portion, a small diaphragm plate mounted pivotally between said front lens portion and said rear lens portion and rotatable relative to said large diaphragm plate, a shutter plate mounted pivotally between said front lens portion and said rear lens portion and rotatable relative to said large diaphragm plate, first and second actuating elements mounted on said rear lens portion, and two pivot axles mounted between said front and rear lens portions and distal from each other, said large diaphragm plate having a large aperture, said small diaphragm plate having a first pivot portion pivotally connected to one of said pivot axles, a swing portion opposite to said first pivot portion, a first actuated portion proximate to said first pivot portion, and a small aperture provided in said swing portion, said first actuated portion being actuated by said first actuating element to move said small diaphragm plate between a first position in which said small aperture is aligned with said large aperture, and a second position in which said small aperture is moved away from said large aperture, said shutter plate having a second pivot portion pivotally connected to the other of said pivot axles, a shading portion opposite to said second pivot portion, and a second actuated portion proximate to said second pivot portion, said second actuated portion being actuated by said second actuating element to move said shutter plate between an open position in which said shading portion is away from said large aperture, and a closed position in which said shading portion covers said large aperture, said first and second actuating elements respectively having actuating portions connected to said first and second actuated portions, respectively.

2. The miniaturized lens assembly as claimed in claim 1, further comprising a shell unit including a receiving box having a lens hole, and a cap having a lens hole aligned with said lens hole of said receiving box along a longitudinal axis, said receiving box cooperating with said cap to define a receiving space for receiving said lens unit.

3. The miniaturized lens assembly as claimed in claim 2, further comprising a motor mounted on said shell unit for actuating said lens unit.

4. The miniaturized lens assembly as claimed in claim 1, wherein each of said first and second actuated portions includes an elongate hole.

5. The miniaturized lens assembly as claimed in claim 4, wherein each of said first and second actuating elements includes an electromagnetically operated rod slidable in said elongate hole.

6. The minimized lens assembly as claimed in claim 2, wherein said lens hole of said cap is formed as a stepped hole configuration and includes a large diameter ring portion, a small diameter ring portion, a shoulder face between said large and small diameter ring portions, and an annular groove formed in said shoulder face, said shell unit further including a protecting lens mounted to said large diameter ring portion, and a leak-proof element mounted in said annular groove.

* * * * *